(12) United States Patent
Bischof

(10) Patent No.: US 12,028,827 B2
(45) Date of Patent: Jul. 2, 2024

(54) OPERATING A WIRELESS RECEIVER

(71) Applicant: AUDI AG, Ingolstadt (DE)

(72) Inventor: Klaus Bischof, Hilpoltstein (DE)

(73) Assignee: AUDI AG, Ingolstadt (DE)

( * ) Notice: Subject to any disclaimer, the term of this patent is extended or adjusted under 35 U.S.C. 154(b) by 248 days.

(21) Appl. No.: 17/640,247

(22) PCT Filed: Aug. 28, 2020

(86) PCT No.: PCT/EP2020/074100
§ 371 (c)(1),
(2) Date: Mar. 3, 2022

(87) PCT Pub. No.: WO2021/043681
PCT Pub. Date: Mar. 11, 2021

(65) Prior Publication Data
US 2022/0346053 A1     Oct. 27, 2022

(30) Foreign Application Priority Data
Sep. 3, 2019   (DE) ..................... 10 2019 213 321.5

(51) Int. Cl.
*H04W 4/44*      (2018.01)
*H04H 60/43*     (2008.01)
(Continued)

(52) U.S. Cl.
CPC ............ *H04W 64/00* (2013.01); *H04H 60/43* (2013.01); *H04H 60/51* (2013.01); *H04H 60/66* (2013.01); *H04W 4/44* (2018.02); *H04H 2201/30* (2013.01)

(58) Field of Classification Search
CPC ........ H04W 64/00; H04W 4/44; H04H 60/43; H04H 60/51; H04H 60/66; H04H 2201/30
See application file for complete search history.

(56) References Cited

U.S. PATENT DOCUMENTS

| 10,182,249 B2 | 1/2019 | Kuhlmann et al. |
| 2011/0159800 A1 | 6/2011 | Ueoka et al. |

(Continued)

FOREIGN PATENT DOCUMENTS

| DE | 4206394 A1 | 9/1993 |
| DE | 102010003306 A1 | 9/2011 |

(Continued)

OTHER PUBLICATIONS

International Search Report and Written Opinion of the International Searching Authority directed to related International Patent Application No. PCT/EP2020/074100, mailed Oct. 14, 2020, with attached English-language translation; 21 pages.

(Continued)

*Primary Examiner* — Kenneth T Lam
(74) *Attorney, Agent, or Firm* — Sterne, Kessler, Goldstein & Fox P.L.L.C.

(57) ABSTRACT

The present disclosure relates to a method for operating a wireless receiver to receive station signals from transmitting stations via communication channels and to emit a selected one of the station signals.
The method selects communication channels to transmit the selected one of the station signals,
  detects reception properties for the selected communication channels,
  detects position data of the wireless receiver,
  assigns the position data of the wireless receiver to the reception properties detected with regard to the selected communication channels, determines a position-related received data set for the selected one of the station signals, and
  transmits the position-related received data set to a server device that stores the position-related received data set to be retrievable by the server device.

10 Claims, 5 Drawing Sheets

(51) Int. Cl.
H04H 60/51 (2008.01)
H04H 60/66 (2008.01)
H04W 64/00 (2009.01)

(56) References Cited

U.S. PATENT DOCUMENTS

| | | |
|---|---|---|
| 2011/0167016 A1 | 7/2011 | Shaban et al. |
| 2012/0129548 A1* | 5/2012 | Rao ............... H04W 64/00 455/456.1 |
| 2012/0201328 A1 | 8/2012 | Fuss et al. |
| 2014/0213175 A1 | 7/2014 | Jaisimha et al. |
| 2015/0282112 A1* | 10/2015 | Bialer ............. H04L 45/24 455/456.1 |
| 2016/0088429 A1* | 3/2016 | Gao ............... G01S 5/0045 455/456.1 |
| 2020/0154242 A1* | 5/2020 | Yu .................. H04W 4/023 |
| 2020/0178201 A1* | 6/2020 | Pan ................. H04L 1/0026 |
| 2022/0236404 A1* | 7/2022 | Gunnarsson ......... G01S 13/878 |

FOREIGN PATENT DOCUMENTS

| | | |
|---|---|---|
| DE | 102012012272 A1 | 1/2013 |
| DE | 102014226142 A1 | 6/2016 |
| DE | 102017214237 A1 | 2/2019 |
| GB | 2413906 A | 11/2005 |
| WO | WO 03049339 A2 | 6/2003 |

OTHER PUBLICATIONS

International Preliminary Report on Patentability directed to related International Patent Application No. PCT/EP2020/074100, completed Mar. 3, 2021, with attached English-language translation; 15 pages.

* cited by examiner

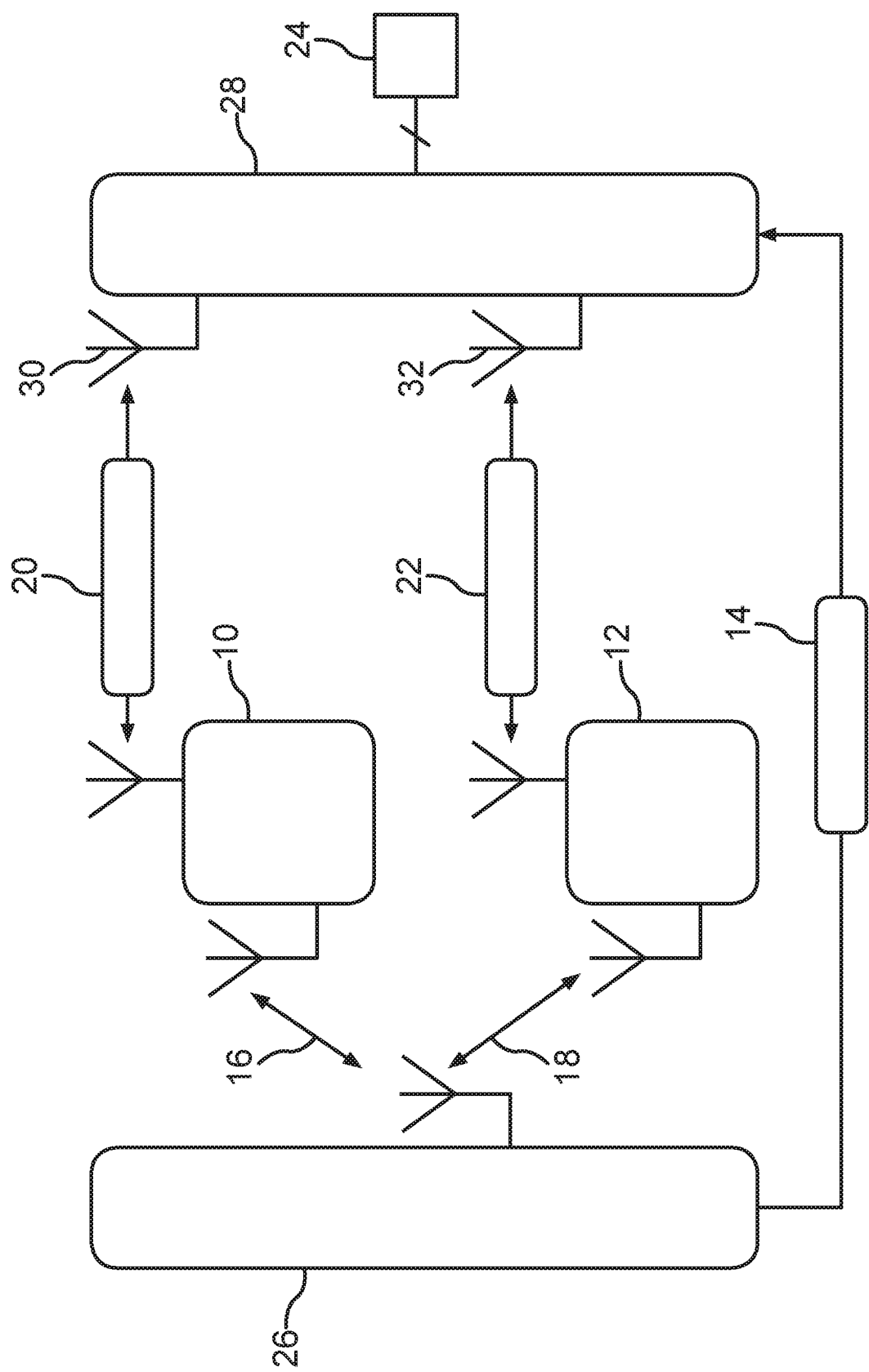

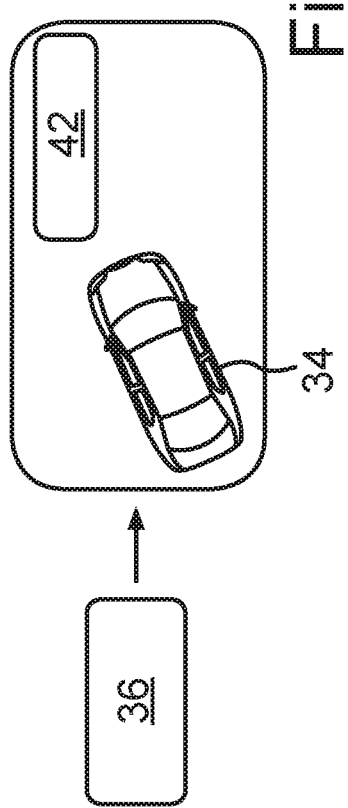
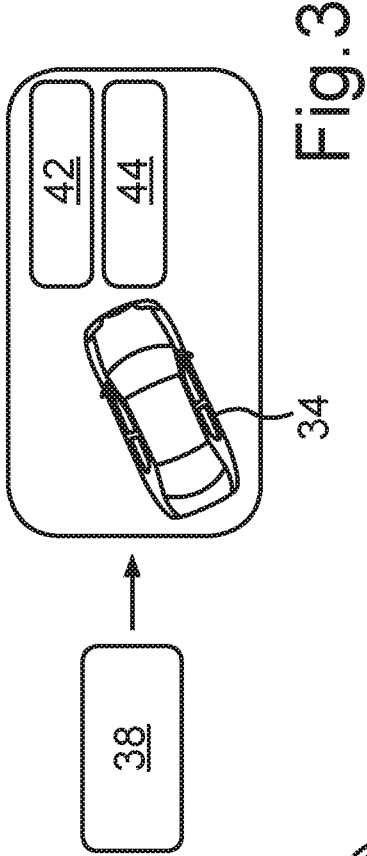
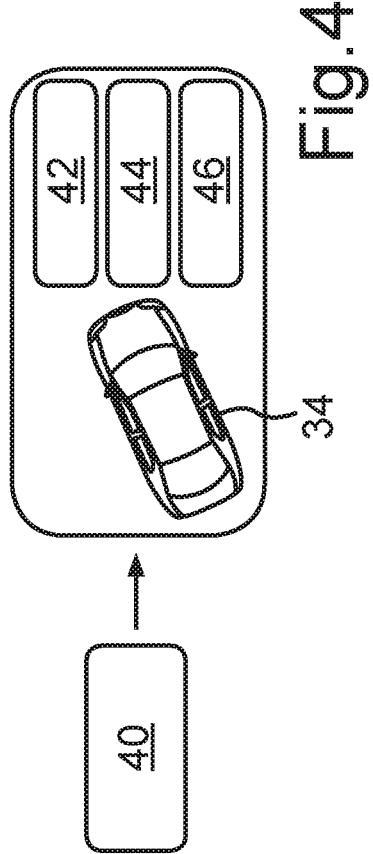

OPERATING A WIRELESS RECEIVER

TECHNICAL FIELD

The present disclosure relates to a method for operating a wireless receiver which receives station signals transmitted via communication channels from transmitting stations and emits a selected one of the station signals. The present disclosure also relates to a method for operating a server device. The present disclosure also relates to wireless receivers which are designed to receive station signals that are transmitted via communication channels from transmitting stations and to emit a selected one of the station signals. The present disclosure also relates to a motor vehicle having a wireless receiver. Finally, the present disclosure also relates to server devices.

BRIEF SUMMARY

Wireless receivers, in particular radio broadcast receivers, are known in a large number of configurations in the prior art. Wireless receivers are used to receive at least one station signal transmitted unidirectionally by a transmitting station in order to obtain data or information therefrom that can be emitted to a user of the wireless receiver. For this purpose, the user can preferably select a station signal from a transmitting station for emission on the wireless receiver, for example by setting the wireless receiver accordingly to a radio channel for the selected station signal.

The information or data are provided by the particular transmitting station by means of the station signal, which is then transmitted over a predetermined communication channel. In the case of a radio station, this can be implemented by a radio transmitter which provides at least one corresponding radio channel for transmitting the station signal. Radio broadcasting is therefore, in particular, a unidirectional information or data transmission from the radio station to the radio receiver using the station signal. In the case of radio broadcasting, information transmission in the opposite direction is generally not provided. Usually, but not exclusively, the station signal of the transmitting station is used to transmit information or data in the form of video, audio and/or the like, that is to say, for example, television or radio.

Particularly with mobile audio reception by means of an audio radio receiver, colloquially also called "radio," but occasionally also with stationary reception by means of a wireless receiver, the problem can arise that the station signal of a transmitting station selected by the user can be received only poorly, for example distorted, via a communication channel set on the wireless receiver. The user can then try to improve reception by changing the setting or selecting a different communication channel, for example a different radio channel in the case of radio broadcasting. Modern wireless receivers, especially car radios, can also have an automatic switching option, in which the car radio or audio radio receiver is automatically switched from a first radio channel to a second radio channel, both of which transmit the same station signal, in order to improve reception.

Nevertheless, the problem can arise that the emission of the station signal can be distorted, for example because the wireless receiver first examines the communication channels that can be received in order to determine which of the receivable communication channels can be used to reliably receive the desired or selected one of the station signals. For this purpose, a certain period of time is usually required, during which the emission of the station signal can, for example, be distorted and/or interrupted.

A method for receiving radio signals in a vehicle and a radio broadcast receiver are known from DE 10 2014 226 142 A1. The radio reception is to be improvable by using diversity. For this purpose, DE 10 2014 226 142 A1 deals with the question of how a more effective assignment of reception paths to playback devices can be achieved. For this purpose, a velocity of the vehicle in which the radio broadcast receiver is arranged is to be determined, and a number of reception paths to be used for radio reception is predefined depending on the velocity of the vehicle.

Furthermore, US 2011/0167016 A1 discloses a map-based radio usage analysis. Finally, WO 03/049339 A2 discloses a system and a method for determining area-wide vehicle radio listener statistics.

In the mobile sector in particular, it has proven to be disadvantageous that reception can continue to be distorted even when the automatic switching of radio channels is used. Special technologies with regard to "soft" switching are known in the art; however, it cannot be completely prevented that in some cases considerable interference occurs, particularly when the wireless receiver is moving. Finally, it should be noted that the switchover itself, especially if it occurs frequently, can lead to interference with regard to the emission of the station signal.

BRIEF DESCRIPTION OF THE DRAWINGS/FIGURES

FIG. 1 is a schematic block diagram of a radio transmission system with a radio station, a radio transmitter, a server device connected via a communication network, and two wireless receivers arranged in motor vehicles.

FIG. 2 is a schematic representation of an exemplary motor vehicle whose wireless receiver receives a station signal from a station A as a selected station signal.

FIG. 3 is a schematic representation of an exemplary motor vehicle whose wireless receiver receives a station signal from a station G as a selected station signal.

FIG. 4 is a schematic representation of an exemplary motor vehicle whose wireless receiver receives a station signal from a station C as a selected station signal.

DETAILED DESCRIPTION

Figure 5:
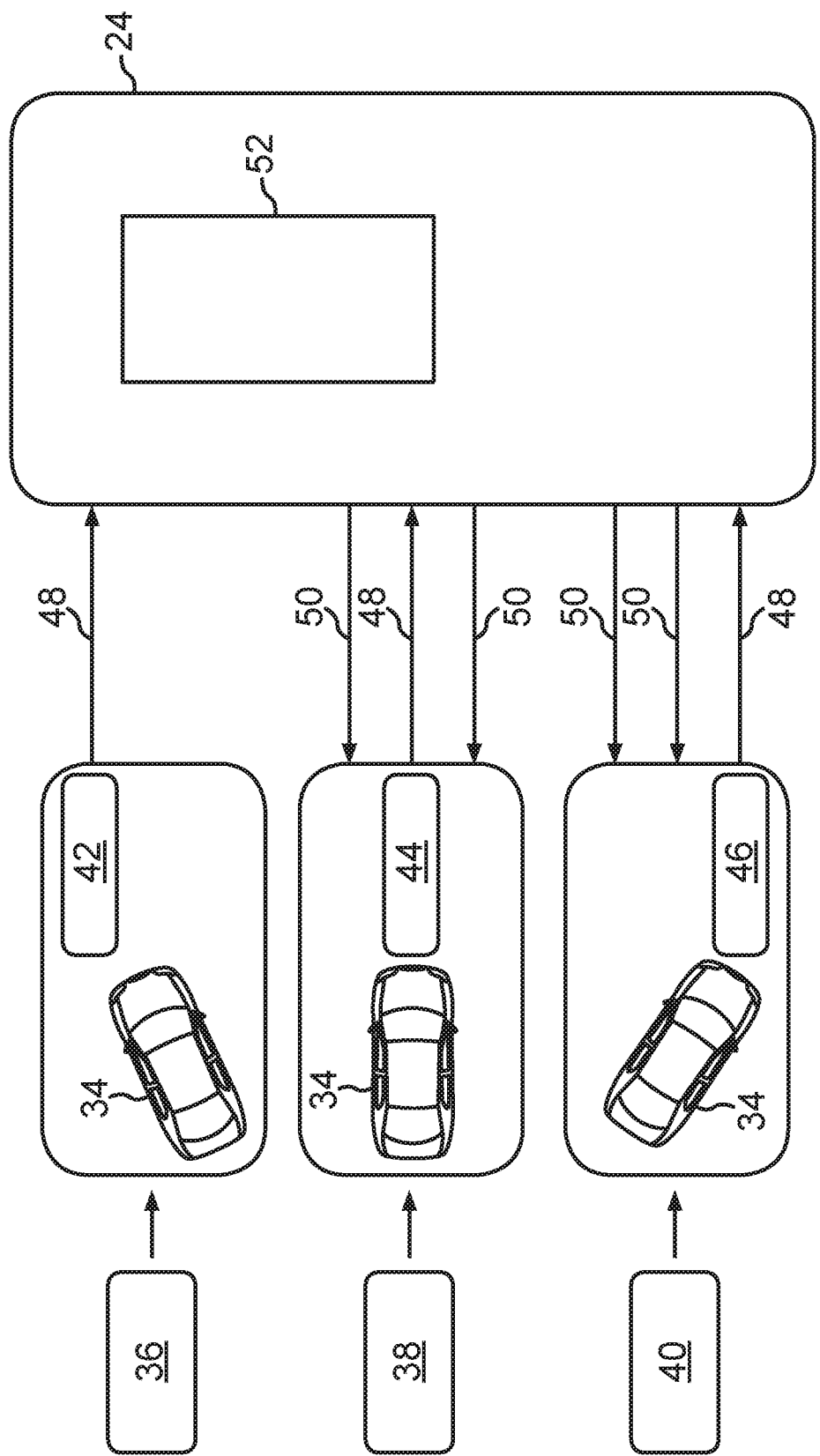
FIG. 5 is a schematic representation based on FIGS. 2 to 4, illustrating the wireless receivers of the exemplary motor vehicles transmitting position-related received data sets to a server device.

The object of the present disclosure is to improve the reception and emission of a selected station signal.

As a solution, the present disclosure proposes methods for operating a wireless receiver, methods for operating a server device, wireless receivers, a motor vehicle with a wireless receiver, and server devices according to the independent claims.

Advantageous further developments arise from the features of the dependent claims.

With regard to a method for operating a wireless receiver according to a first aspect, which receiver receives station signals transmitted via communication channels from transmitting stations and emits a selected one of the station signals, the method comprising the following steps.

As one step, the method includes determining the communication channels for a particular one of the station signals via which the particular one of the station signals is transmitted.

As another step, the method includes detecting reception properties for the determined communication channels.

It is proposed in particular that the method comprises the following further steps.

As a further step, the method includes detecting position data from the wireless receiver.

As another further step, the method includes assigning the position data to the reception properties detected with respect to the determined communication channels, a position-related received data set being determined for at least one of the station signals.

As another further step, the method includes transmitting the at least one position-related received data set to a server device, in order to store the at least one position-related received data set so that it is retrievable by the server device.

With regard to a method for operating a wireless receiver according to a second aspect, which receiver receives station signals transmitted via communication channels from transmitting stations and emits a selected one of the station signals, it is proposed in particular that the method comprises the steps of: the position data of the wireless receiver being determined, at least the position data and data on the selected one of the station signals being transmitted to a server device that stores position-related received data sets so that it is retrievable by the server device, a position-related received data set for the selected one of the station signals being received by the wireless receiver in response to the data transmitted to the server device on the basis of the position data, and the wireless receiver setting the communication channel based on the received position-related received data set for receiving and emitting the selected one of the station signals.

With regard to a method for operating a wireless receiver according to the second aspect, which receiver receives station signals transmitted via communication channels from transmitting stations and emits a selected one of the station signals, it is further proposed in particular that the method comprises the steps of: the position data of the wireless receiver being determined, at least the position data and data on the selected one of the station signals being transmitted to a server device that stores the position-related received data set so that it is retrievable by a server device, identification data for a communication channel having the most favorable reception properties as determined by the server device being received in response to the data transmitted to the server device and the wireless receiver setting this communication channel to receive and emit the selected one of the station signals based on the identification data.

With regard to a method for operating a server device according to the second aspect, it is proposed in particular that position-related received data sets transmitted by wireless receivers which contain at least position data of the wireless receiver and reception properties relating to station signals transmitted via communication channels from transmitting stations, are received by the server device and stored so that they are retrievable, the server device receiving at least position data and data on a selected one of the station signals from a particular receiver, determining for the position data and the data on the selected one of the station signals a position-related received data set for the selected one of the station signals and transmitting this position-related received data set to the receiver.

With regard to a method of operating a server device according to the second aspect, it is also proposed in particular that position-related received data sets transmitted by wireless receivers, which data sets contain at least position data of the wireless receiver and reception properties relating to station signals transmitted via communication channels from transmitting stations, are received and stored so that they are retrievable by the server device, the server device receiving from a particular receiver at least position data and data on a selected one of the station signals, determining for the position data and the selected one of the station signals the particular one of the communication channels having the most favorable reception properties and transmitting identification data for this communication channel to the receiver.

With regard to a generic wireless receiver, it is proposed according to the first aspect in particular that the wireless receiver is also designed to execute the following steps.

As one step, the wireless receiver is designed to determine the communication channels for a particular one of the station signals via which the particular one of the station signals is transmitted.

As another step, the wireless receiver is designed to detect reception properties for the determined communication channels.

As another step, the wireless receiver is designed to detect position data of the wireless receiver.

As another step, the wireless receiver is designed to assign the position data to the reception properties detected with regard to the determined communication channels, in order to determine a position-related received data set for at least one of the station signals.

As another step, the wireless receiver is designed to transmit the at least one position-related received data set to a server device.

With regard to a generic wireless receiver, it is proposed according to the second aspect in particular that the wireless receiver is designed to determine position data of the wireless receiver, to transmit at least the position data and data on the selected one of the station signals to a server device which stores position-related received data sets so that they are retrievable, to receive identification data for the communication channel having the most favorable reception properties as determined by the server device in response to the data transmitted to the server device and to set the wireless receiver to receive and emit the selected one of the station signals based on the identification data on this communication channel.

With regard to a motor vehicle of the generic type, it is proposed in particular that the wireless receiver be designed according to the present disclosure.

With regard to a server device, it is proposed according to the second aspect in particular that it is designed to receive position-related received data sets transmitted by wireless receivers, which data sets contain at least position data of the wireless receiver and reception properties relating to station signals transmitted via communication channels from transmitting stations and to store them so that they are retrievable, the server device also being designed to receive at least position data and data on a selected one of the station signals, to determine a position-related received data set for the selected one of the station signals for the position data and data on the selected one of the station signals and to transmit this position-related received data set to the wireless receiver.

With regard to a server device, it is further proposed in particular according to the second aspect that it is designed to receive position-related received data sets transmitted by wireless receivers, which contain at least position data of the wireless receiver and reception properties relating to station signals transmitted via communication channels from transmitting stations and to store them so that they are retrievable, the server device being further designed to receive from a particular wireless receiver at least position data and data on a selected one of the station signals, to determine for the position data and the data on the selected one of the station signals the communication channels having the most favorable reception properties and to transmit identification data on this communication channel to the wireless receiver.

The present disclosure is based, among other things, on the idea that through a centralized collection of data relating to position-related reception properties, data can be collected and provided at least by wireless receivers, which data can be transmitted on request to a selected wireless receiver, so that the wireless receiver can use this data, in particular the identification data, to almost immediately determine and set a suitable communication channel for receiving and emitting a selected station signal. Therefore, the wireless receiver does not even need to determine a suitable communication channel or the communication channel having the most favorable reception properties for its current position, for example by scanning all communication channels.

The present disclosure preferably comprises two aspects, a first aspect being concerned with collecting the necessary data, storing them in a centralized retrievable manner, and making them available. A second aspect is concerned with making the collected and centrally retrievably stored data available for a specific use by a particular wireless receiver. The first aspect therefore deals with the determination or collection of corresponding position-related received data sets, whereas the second aspect deals with their use. The present disclosure is particularly suitable if, according to the first aspect, position-related received data sets are determined accordingly by a large number of wireless receivers and transmitted to the server device, where the position-related received data sets are to be detected for as many different position data as possible. As a result, it can be achieved, among other things, that in particular mobile wireless receivers can be set very quickly to a particular suitable communication channel with regard to a station signal to be emitted, so that interference and/or interruptions in the emission of the selected one of the station signals can be reduced. The present disclosure thus makes it possible, for example, to provide an extensive database on position-related reception properties via the server device, which can not only be created or further developed due to large number of wireless receivers, but which also makes it possible to ensure high quality with regard to the use of identification data transmitted to a particular wireless receiver, for example, due to the corresponding large number of data.

Radio broadcasting within the meaning of the present disclosure denotes unidirectional communication between communication partners, in this case a radio station and a radio broadcast receiver, communication only being possible, for example, from one of the communication partners to the other of the communication partners. Of course, a particular radio station can also use more than one radio transmitter in order to transmit its station signal or radio station signal by means of the communication channels, which in this case are radio channels. The radio signal or signals can be received by at least one radio broadcast receiver. Radio broadcasting is usually wireless and is characterized by the fact that electromagnetic waves are often used as the medium for the broadcasting signals. Radio broadcasting can, for example, also include streaming via an, in particular, digital communication network which at least partially uses radio for signal transmission. The communication channel is therefore implemented at least partially wirelessly.

The communication channel is preferably designed for wireless communication and is preferably based on radio transmission, for example using electromagnetic waves. The communication channel can be, for example, a radio channel for a radio transmission. However, the communication channel can at least partially also be a digital communication channel, for example a wireless communication network such as GSM, UMTS, LTE and/or the like. Such communication channels basically allow bidirectional communication, but these communication channels are mainly only used unidirectionally within the meaning of the present disclosure for the transmission of the station signals. Such a use can therefore also be, for example, a "streaming" of the station signal.

The station signal or radio station signal is preferably an information signal and can, for example, be a video signal, an audio signal, a data signal, combinations thereof or the like. The station signal is provided by the transmitting station via a particular communication channel.

The transmitting station, in particular also the radio transmitter, are generally arranged as fixed or stationary devices. Occasionally, however, they can also be mobile.

It can be provided that the transmitting station provides a source coding and/or source modulation for the station signal it transmits, which allows largely complete and reliable information reconstruction or data reconstruction by the wireless receiver. For this purpose, the wireless receiver can be equipped with suitable source decoding and/or source demodulation units.

In addition, it can be provided that the station signal transmitted by the transmitting station is provided with a transmitting-station-specific modulation and/or with a channel coding. A reliable and interference-free transmission of the station signal from the transmitting station to the wireless receiver can thereby be achieved. Correspondingly, the wireless receiver can comprise suitable units for this, for example a channel decoding unit and/or a demodulator unit adapted to the modulation of the transmitting station. Modulation methods can be, for example, amplitude modulation, frequency modulation, phase modulation, amplitude quadrature modulation, combinations thereof or the like.

For the first aspect, the wireless receiver detects communication channels in which, for example, the selected one of the station signals is transmitted. The wireless receiver can, however, additionally or alternatively determine the communication channels that transmit station signals from transmitting stations that are not the selected one of the station signals. This makes it possible not only to determine the communication channels for the selected one of the station signals, but also—as required—to determine the communication channels via which the station signals are transmitted from other transmitting stations than the selected one of the transmitting station. This makes it possible to detect the reception properties for a large number of the determined communication channels and to make them available.

For this purpose, it is provided that the wireless receiver detects position data, specifically preferably position data on its own, in particular current, position. For this purpose, the wireless receiver can comprise a GPS unit or the like. In addition, when the wireless receiver device is arranged in a motor vehicle, it can be provided that the wireless receiver device is in communication with a navigation device of the motor vehicle and receives current position data therefrom. These position data, which correspond to the position of the wireless receiver when detecting the reception properties for the determined communication channels, are assigned to the reception properties detected with respect to the determined communication channels, so that a position-related received data set is determined for at least one of the station signals. The received data set thus includes at least the position data and the reception properties that the wireless receiver has detected at the position according to the position data.

For this purpose, the position-related received data set can have been determined for a particular one of the station signals and comprise at least one communication channel. Of course, the received data set can also include a plurality of communication channels for the same station signal. In addition, it is of course possible to individually provide a position-related received data set for a particular one of the determined communication channels. A particular received data set preferably also includes data relating to the station signal which is transmitted via the particular communication channel.

The position-specific received data sets determined in this way are then transmitted to the server device. There, they are at least stored so that they are retrievable. For this purpose, the server device can comprise one or more memory units. The server device can be a central server device. In alternative embodiments, however, it can also be arranged distributed over a plurality of locations, for which purpose the server device can comprise individual server units at the particular locations that are in communication with one another.

The server device can also include a computer unit that allows the position-related received data sets to be evaluated, for example to determine the communication channel for predefined position data that specifies the most favorable reception properties of a station signal for a wireless receiver positioned at the position data. The most favorable reception properties can include, for example, a reception field strength, a data rate, a degree of modulation and/or the like. In addition, distorting effects such as jammers or the like can of course also be taken into account. The computer unit makes it possible to use a suitable computer program to determine a selection functionality for a station signal at a specific position of a particular wireless receiver. The most favorable communication channel determined in this way can then be assigned, for example, identification data which allow the communication channel to be identified by the receiver. This makes it possible for the wireless receiver to set the corresponding communication channel on the basis of the identification data.

The wireless receiver can detect communication channels in which the station signal of the selected transmitting station is transmitted by means of a separate communication channel in each case. For this purpose, for example, an entire reception range of the wireless receiver can be scanned with regard to the total available communication channels. The scan can be used to determine which communication channels contain a signal that can be received for the station signal. In this way, the communication channels that initially transmit any receivable station signals at all can be detected. The received station signals can then be analyzed with regard to channel-specific parameters. Channel-specific parameters can be, for example, a selected channel coding, a selected modulation, a received field strength, a type of reception, an identifier of the transmitting station whose station signal is transmitted by means of the communication channel, combinations thereof and/or the like. In this way, the wireless receiver can determine the communication channels via which what station signals, in particular the selected station signal, can be received.

The channel-specific parameters can be the same for a plurality of or all communication channels. Usually, however, they are dependent on the type of communication channel, for example on whether the communication channel is a radio channel intended for broadcasting radio in an ultra-short wave range, or on whether the communication channel is provided by a cellular network, or the like. The station signals of the communication channels, preferably the established communication channels that transmit the station signal of the selected transmitting station, are treated taking into account the particular channel-specific parameters, for example by performing suitable demodulation and/or decoding. This makes it possible to provide the station signal accordingly on the receiving side. This is preferably done channel-selectively, that is, the treatment takes place independently of the other communication channels.

The communication channels are preferably at least partially wireless communication channels that are at least partially based on the use of radio.

The transmitting station is a device that disseminates information or data, for example in the manner of radio broadcasting. For this purpose, a particular station signal of a particular transmitting station is treated in accordance with a communication channel over which the communication channel is to be transmitted, for example by it being subjected to modulation and/or coding. In addition, further treatments can of course also be provided which can improve the quality of the station signal, in particular also on the receiving side. For this purpose, error-correcting encodings or the like can be used.

The communication channels for a particular one of the station signals can be determined by corresponding scanning of the communication channels that can be received by means of the wireless receiver. The determination can be limited to the selected one of the station signals. In addition, of course, there is also the possibility that, in addition to the selected station signal, the determination also includes non-selected station signals. Finally, it can also be provided that the determination only includes non-selected station signals. Depending on requirements, this can also be provided by a selection of station signals which, for example, a user of the wireless receiver can make or the like.

The scanning of the communication channels need not be limited to a specific type of communication channels, for example radio channels. Further communication channels can also be detected during scanning, via which a particular one of the station signals can be received, for example via a cellular network or a comparable communication network.

The reception properties are then determined for the communication channels determined in this way. The reception properties can include a type of modulation, a coding, a degree of modulation, a received signal strength, a standardized volume value, a value for a reception quality and/or the like. In addition, the reception properties can also include quality data relating to the communication channel, for example whether the communication channel is distorted or the like. The reception properties can be used, among other things, by the wireless receiver in order to be able to receive and emit the selected station signals with the highest possible quality.

The emission of the station signal by the wireless receiver can be given by an electrical signal which is used by a playback device to play back the data or the information. For example, the playback device can be an amplifier or a television set. However, it can also be provided that the wireless receiver itself emits the selected one of the station signals for a user, for example acoustically, visually or the like. For this purpose, the wireless receiver can comprise suitable emission units.

According to the first aspect, position data of the wireless receiver are detected. For this purpose, it can be provided that position data can be entered into the wireless receiver by a user. In addition, it can also be provided that the wireless receiver itself has a locating unit, for example based on the use of GPS or the like, in order to be able to determine the position data of the wireless receiver itself as needed. In addition, especially when the wireless receiver is arranged in a motor vehicle, there is of course the possibility of coupling the wireless receiver to other devices of the motor vehicle that can provide a corresponding location function, for example a navigation device or the like.

The wireless receiver has a control unit or an evaluation unit, which assigns the detected position data of the wireless receiver to the reception properties detected with respect to the determined communication channels. In this way, position-related received data sets can be determined, which can be determined separately for each of the communication channels, for example. However, it can also be provided that the received data sets are determined at least partially in a station-signal-specific manner or even in a transmitting-station-specific manner. The position-related received data set can accordingly contain additional information.

The position-related received data sets determined in this way are then transmitted to a server device, in order to store them such that they are retrievable by the server device. As a result, the received data sets can be made available to a large number of users or wireless receivers, so that reception of a station signal at a particular position of a particular wireless receiver can be improved.

The transmission can take place continuously or else at predetermined instants. For example, the transmission can take place when there is, in particular, a bidirectional communication link between the wireless receiver and the server device. This does not need to be permanently available, but can only be present temporarily, for example in the case of mobile wireless receivers. In the meantime, the position-related received data sets that the wireless receiver has determined can be temporarily stored until they can be transmitted to the server device. In principle, there is of course the possibility of also storing each of the position-related received data sets determined by the wireless receiver itself. As a result, the corresponding received data sets are immediately available in the wireless receiver itself. However, this limits the availability for other wireless receivers.

The server device can be a computer unit which comprises a memory unit which, for example, can comprise one or more hard disks or the like. The server device can be arranged at a central point and can be reached in terms of communication technology, for example, via a communication network such as the Internet or the like. For example, it can be provided that the wireless receiver can be brought into communication with the server device at least temporarily via a wireless radio connection, such as WLAN or the like and the Internet. The server device can, however, also be arranged spatially distributed and comprise two or more computer devices with corresponding memory units that are coupled to one another in terms of communication technology, for example via a communication network such as the Internet or the like.

According to an advantageous further development, it is proposed that at least the detection of the reception properties of the determined communication channels and the position data of the wireless receiver take place at at least one predetermined instant. This makes it possible to uniquely assign the position data with regard to the determined reception properties in a simple manner, in particular if the wireless receiver is arranged in a mobile manner, for example in a motor vehicle or the like. As a result, a current position of the wireless receiver can be assigned to the currently detected received data. Of course, it can be provided that the received data as well as the position data are continuously determined and assigned. As a result, a reception profile can be determined in relation to the position data, which makes it possible to achieve a good resolution even in the case of reception properties that change significantly in short distances, which makes it possible to set wireless receivers specifically to each of the position data depending on their own movement to allow or to forecast reception channels, so that the reception of the selected station signal can be significantly improved even while the wireless receiver is moving. This property is particularly suitable in mountainous terrain, in which the wireless receiver is carried, or in urban areas, especially in buildings with high-rise buildings, because here the reception of wireless communication channels can be strongly influenced by the geographic boundary conditions.

In addition, it is proposed that the position data of the wireless receiver be determined again at at least one predetermined instant and that the method is repeated if the position data of the wireless receiver changes. This makes it possible for the wireless receiver to determine that it has been moved, as a result of which the wireless receiver registers the reception properties of the communication channels and assigns them to the new position data. Of course, it can be provided that not just one predetermined instant is provided in order to determine the position data of the wireless receiver again. Rather, it can be provided that a plurality of instants is specified, for example instants equidistantly spaced apart or the like. In addition, there is of course the possibility that the specified instants are selected depending on the movement of the wireless receiver, for example by specifying the instants in a shorter time in succession when the wireless receiver is at high velocity, whereas with a low velocity of the wireless receiver a correspondingly larger time interval between the predetermined instants can be chosen. For this purpose, the wireless receiver can preferably continuously detect the position data and from this determine the movement of the wireless receiver. This can be implemented by the control unit of the wireless receiver or also by the evaluation unit.

The control unit or the evaluation unit of the wireless receiver is preferably an electronic hardware circuit which can comprise a program-controlled computer unit or can even be formed thereby. The hardware circuit or the computer unit are designed to provide the desired functionality of the wireless receiver in order to be able to implement the function of the present disclosure. If a computer unit is present, it can be provided that the function is at least partially implemented by a suitable computer program which is executed by the computer unit.

According to an advantageous further development, it is proposed that at least one of the station signals be received via at least two communication channels which differ from one another, that differential data be determined at least with respect to the particular standardized volume and/or a particular relative time offset of the station signal and be included in the position-related received data set. This makes it possible to obtain comparative data on the communication channels that transmit a specific station signal, which may be the selected one of the station signals. This can be used to decide whether a single communication channel or a plurality of communication channels can be used jointly for an emission of the selected station signal. In addition, a switchover between communication channels can also be provided, specifically depending on which communication channel allows the most favorable reception properties. This is preferably provided for the selected one of the station signals. In addition, however, it is also possible to provide this procedure for a station signal that is not the selected one of the station signals. It can thereby be achieved that a database which is provided by the server device can be supplied with as many position-related received data sets as possible, so that an extensive database can be provided which can keep the received data sets available for a large number of position data. Depending on requirements, these received data sets can be retrieved from the server device by a particular wireless receiver.

With regard to the second aspect of operating the wireless receiver, it is provided that the wireless receiver determines position data. These position data as well as data on the selected one of the station signals are transmitted to a server device which—as explained above—stores position-related received data sets so that they are retrievable. The server device is designed to evaluate the position data and the data for the selected one of the station signals and, for example, to determine the communication channel having the most favorable reception properties for the wireless receiver at its transmitted position. Of course, it can also be provided that the server device only determines a corresponding position-related received data set from the stored data sets.

For this purpose, the server device comprises, for example, an evaluation unit which can comprise a hardware circuit and/or a computer unit in order to determine the desired functionality. The most favorable reception properties can be, for example, the greatest received signal strength, the greatest standardized volume value, the greatest degree of modulation or even the least interference in the particular communication channel. A combination of these can of course also be provided. The evaluation unit of the server device determines, for example, the most favorable communication channel for receiving the selected station signal on the basis of predefinable or weighted reception properties. The evaluation unit of the server device can assign identification data to the communication channel determined in this way, thereby allowing the wireless receiver to identify and set the determined communication channel. The identification data are transmitted from the server device to the wireless receiver. Alternatively, the determined position-related received data set can also be transmitted to the wireless receiver. The wireless receiver receives the identification data and then sets this communication channel to receive the selected one of the station signals on the basis of the identification data or the received position-related received data set. The transmission of the identification data can take place in the same way as the transmission of the position data and the data for the selected one of the station signals to the server device took place, for example via a bidirectional communication link such as a cellular network or the like.

It is preferably proposed that the wireless receiver is arranged on a motor vehicle, the motor vehicle being guided according to a route specified by a navigation device and the position data of the wireless receiver being determined on the basis of the given route. In this further development, it is provided that the wireless receiver can not only transmit position data relating to its current position to the server device, but it can also transmit position data to the server device for further positions in the future. This makes it possible to receive corresponding identification data or position-related received data sets from the server device in advance for at least part of the specified route and to keep them available, so that the corresponding identification data or position-related received data sets are activated depending on a particular position reached by the motor vehicle or the wireless receiver so that, for example, the correspondingly most favorable communication channel can be used for the particular position reached. This can significantly improve the reception of the selected station signal.

The server device can be designed to receive and store the position-related received data sets transmitted by the wireless receivers. The storage can take place in such a way that the position-related received data sets can be retrieved at least in part by the server device from the wireless receivers. For this purpose, the server device receives at least the position data and data on the selected one of the station signals from a particular one of the wireless receivers. In the simplest case, the control unit of the server device can then use the position data to search for a suitable position-related received data set in the memory unit of the server device, and identification data for the most favorable communication channel can be determined using the position-related received data set and transmitted to the wireless receiver. The identification data in the simplest case can be the position-related received data sets for the determined position data and the transmitted selected station signal.

In addition, it is of course also possible for the server device to carry out data processing by means of its control unit or evaluation unit. This is particularly advantageous if a plurality of position-related received data sets have been transmitted for position data from different wireless receivers. The evaluation can provide here that the reception properties that have been determined for the same position data from different wireless receivers, in some cases at different instants, are further processed. For example, the reception properties can be averaged if they differ from one another. In addition, further processing, in particular using statistical evaluation methods, can also be used. In addition, it can of course also be provided that the reception properties are weighted depending on an instant of the determination in order to be able to determine more precise reception data. Further processing can be provided.

The identification data can designate, for example, a radio channel, an IP address when using a digital cellular network or the like. In this case, the wireless receiver does not need to provide any signal processing capacity in order to be able to determine the most favorable of the communication channels. This can be provided centrally by the server device.

The advantages and effects specified for the method according to the present disclosure naturally also apply equally to the wireless receivers according to the present disclosure, the server device according to the present disclosure and the motor vehicle according to the present disclosure, and vice versa. Process features can therefore also be formulated as device features or vice versa.

The present disclosure also includes further developments of the method according to the present disclosure, which have features such as those that were previously described in connection with the further developments of the motor vehicle according to the present disclosure. For this reason, the corresponding further developments of the method according to the present disclosure are not described again herein.

The motor vehicle according to the present disclosure is preferably designed as a car, in particular as a passenger car or truck or as a passenger bus or motorcycle.

The present disclosure also comprises the combinations of the features of the described embodiments.

Embodiments of the present disclosure are described below.

The embodiments explained below are preferred embodiments of the present disclosure. In the embodiments, the described components of the embodiments each represent individual features of the present disclosure which should be considered independently of one another and which each develop the present disclosure further independently of one another. The disclosure is therefore also intended to include combinations of the features of the embodiments other than those presented. Furthermore, the described embodiments may also be supplemented by further features of the present disclosure as already described.

In the figures, the same reference signs refer to functionally identical elements.

FIG. 1 shows, in a schematic block diagram, a general architecture for improving the reception of station signals 36, 38, 40 (FIGS. 2 to 4) transmitted via communication channels 16, 18, 20, 22 from transmitting stations, one of which is shown with the reference numeral 14 in FIG. 1. The station signal of the transmitting station 14 can be transmitted via a station transmitter 26 that is in communication with the transmitting station 14, for example by the station signal being transmitted in the manner of radio broadcasting via communication channels 16, 18 in the manner of radio channels. Such radio broadcasts are often broadcast in an ultra-short wave range. The communication channels 16, 18 are formed in this case by radio channels, which are defined by corresponding frequency bands. The transmission of the station signal via radio is not limited to USW (ultra-short wave), but can of course also take place in other ranges suitable for radio, for example medium wave (MW), short wave (KW) and/or the like. Depending on the transmission properties of the particular communication channel 16, 18, 20, 22, it can be provided that a corresponding modulation and/or coding of the station signal is used in order to improve or allow the reliability and/or quality of the transmission.

In addition, the station signal of the transmitting station 14 can also be transmitted in the manner of streaming via a digital, at least partially wireless network, for example using a cellular network such as GSM and/or the like. For this purpose, the use of a communication network such as WLAN, in particular the Internet and/or the like, can also be considered.

In the present embodiment, it is provided that the communication channels 20, 22 are communication channels of a cellular network, via which the station signal of the transmitting station 14 can be streamed. For this purpose, transmit/receive stations 30, 32 for GSM transmission are positioned at suitable points, which allow the wireless receivers located within communication range, such as in this case the wireless receivers 10, 12, via which communication channels 20, 22 can establish a communication link with the particular transmitting-receiving station 30, 32. In the present case, the transceiver stations 30, 32 are coupled to the Internet 28 in terms of communication technology. The Internet 28 is simultaneously coupled in terms of communication technology to the transmitting station 14. In this way, the station signal from the transmitting station 14 can be streamed.

In FIG. 1, it is not shown that the wireless receivers 10, 12 are arranged on particular motor vehicles, such as the motor vehicle 34 (compare FIGS. 2 to 5). In the present case, the wireless receivers 10, 12 are formed by particular car radios.

Each of the wireless receivers 10, 12 is designed to be able to receive transmitting stations via the communication channels such as the communication channels 16, 18, 20, 22. For this purpose, each of the wireless receivers 10, 12 has corresponding receiving units (not shown). In addition, the wireless receivers 10, 12 are designed in the present case in such a way that they can receive at least station signals via at least two radio channels essentially at the same time. It is preferably provided that the at least two radio channels serve to receive and emit a selected one of the station signals. In the present case, the emission takes place by providing an electrical signal for controlling an audio amplifier, which emits the corresponding station signal acoustically within the particular motor vehicle 34.

In the present embodiment, it is provided that the wireless receivers 10, 12 are in communication with navigation devices (not shown in detail) of the particular motor vehicles 34 and transmit particular position data from these on current positions of the motor vehicles 34 and thus also of the wireless receivers 10, 12. As a result, each of the wireless receivers 10, 12 has position data available with regard to a particular current position. In alternative configurations, it can of course also be provided that each of the wireless receivers 10, 12 comprises a positioning unit which allows the particular position data to be determined, for example using GNSS, in particular GPS or the like. Combinations of these can of course also be provided.

In the present embodiment it is provided that the wireless receivers 10, 12 determine the communication channels 16, 18, 20, 22 for a particular one of the station signals via which the particular one of the station signals is transmitted. In the embodiment according to FIG. 2, only a single transmitting station 14 is provided, which accordingly emits a single station signal. However, it is not limited to this. It goes without saying that a plurality of transmitting stations can be provided, each of which transmits at least a single station signal. In addition, it can of course be provided that a transmitting station 14 does not transmit just a single station signal but, for example, two or three station signals or even more station signals. For example, Südwestdeutsche Rundfunk [Southwest Germany Broadcasting] (SWR) as a transmitting station can transmit station signals SWR1, SWR2, SWR3 and others.

The communication channels are preferably determined for a selected one of the station signals of the transmitting station 14. However, the present disclosure is not limited to this. In alternative embodiments, it can also be provided that the determination of the communication channels also takes place for one or more station signals that do not correspond to the selected one of the station signals. The wireless receivers 10, 12 are then preferably designed to be adapted accordingly, so that the desired functionality can be implemented.

For the determined communication channels 16, 18, 20, 22, the corresponding reception properties are then detected by the wireless receivers 10, 12. The reception properties can include, for example, a received signal strength, a value for the reception quality, a type of modulation and/or a type of coding. Preferably, at least the selected one of the station signals is received via at least two different communication channels; namely the wireless receiver 10 receives the selected station signal via the communication channel 16, which in the present case is a radio channel, and at the same time the wireless receiver 10 receives the same station signal via the communication channel 20 in the manner of streaming. In contrast, the wireless receiver 12 receives the selected station signal via the communication channel 18, which is also a radio channel, at the same time the wireless receiver 12 receives the same station signal via the communication channel 22, likewise in the manner of streaming. This makes it possible for the wireless receivers 10, 12 to be able to determine difference data with regard to the particular determined standardized volume levels and a particular time offset of the station signals relative to one another that is received via the two communication channels 16, 18, 20, 22. Position-related received data sets are determined together with the position data.

The position-related received data sets determined in this way are transmitted via the particular communication channels 20, 22 and the Internet 28 to a server device 24, which stores these position-related received data sets in a database 52 such that they are retrievable. As a result, these position-related received data sets can be made available to a large number of users or wireless receivers 10, 12 in order to improve the reception of a particular one of the station signals, in particular the selected one of the station signals, by the wireless receivers 12, 14.

In the present case it is provided that the position data of the wireless receivers 10, 12 are determined again at a predetermined instant and the method for determining the position-related received data sets is repeated when the position data of the wireless receiver 10, 12 change. This makes it possible, especially when the motor vehicle 34 is in normal driving mode, to determine a large number of position-related received data sets along the route by the wireless receivers 10, 12 and to transmit them to the server device 24. By operating the motor vehicle 34 while driving and at the same time using the particular wireless receiver 10, 12, a large number of data can be determined that can be used to make corresponding position-related received data sets available to other wireless receivers of motor vehicles that are moved along the same positions so that the reception of the particular station signal can be improved.

In this case, the particular wireless receiver 10, 12 therefore does not need to laboriously determine the received data and, if necessary, improve the emission of the particular station signal by switching and/or superimposing communication channels; instead, by using the position-related received data sets, which can be provided by the server device 24, the particular one of the wireless receivers 10, 12 can make a corresponding adjustment with regard to the reception almost immediately and with minimal effort, so that a reaction time can be significantly reduced. This improves the emission of the station signal.

To use the data of the server device 24, the wireless receivers 10, 12 can be operated as follows. The particular one of the wireless receivers 10, 12 receives a selected station signal and emits it. Position data of the wireless receiver 10, 12 are determined, as explained above, where the position data and data on the selected one of the station signals are transmitted to the server device 24. The server device 24 stores a plurality of position-related received data sets in a retrievable manner. In response to the data transmitted to the server device 24, at least one position-related received data set for the selected one of the station signals is determined on the basis of the position data by the server device 24 and transmitted to the wireless receiver 10, 12.

The wireless receiver 10, 12 receives the at least one position-related received data set and adjusts itself to the corresponding communication channel on the basis of the received position-related received data set. This is preferably a single communication channel. However, it can alternatively also be provided that the position-related received data set provides that two or more communication channels can be used for receiving the selected station signal. The wireless receiver 10, 12 can then use one or more of the communication channels 16, 18, 20, 22 to receive and emit the station signal. The wireless receiver 10, 12 can provide that appropriate adjustments are made by using differential data of the position-related received data sets so that switching or superimposing of the station signals that are transmitted via different communication channels can be implemented as trouble-free as possible.

In an alternative embodiment, it can of course also be provided that the server device 24 uses the position data in order to determine the most favorable communication channel for the selected station signal. For this purpose, the server device 24 can then determine identification data which are transmitted to the particular wireless receiver 10, 24. The wireless receiver 10, 12 can then use the identification data to determine and set the corresponding communication channel. In this embodiment of the present disclosure, only a very minimal effort is therefore required on the wireless receiver side, so that a very fast, precise response can be achieved.

The server device 24 is designed to receive the position-related received data sets transmitted by the wireless receivers 10, 12 and to store them in a retrievable manner. If the server device 24 receives position data from the wireless receiver 10, 12 as well as data relating to the selected station signal, the server device 24 can determine a position-related received data set from the stored received data sets and transmit this position-related received data set to the wireless receiver 10, 12. Alternatively, provision can also be made for the server device 24 to determine those communication channels 16, 18, 20, 22 having the most favorable reception properties for the position data and the data on the selected one of the station signals and to transmit identification data on this communication channel to the wireless receiver 10, 12. On the wireless receiver side, only the corresponding communication channel then needs to be set.

Of course, the server device 24 can simply store the received position-related received data sets. In addition, however, it can be provided that the server device 24 further processes the position-related received data sets. The processing can consist, for example, in updating received data sets for the same position data, so that only a single position-related received data set is always available in the database of the server device 24 for the same position data and the same station signals. In addition, it can of course also be provided that the server device 24 comprises a processing unit (not shown) that makes it possible for the server device itself to determine position-related received data sets for position data and/or station signals for which no position-related received data set is available in the database by using statistical methods and possibly also taking into account geographical properties and, where appropriate, to transmit them to the wireless receiver 10, 12. This embodiment has the advantage that gaps in the database relating to the position data and/or the station signals can be filled. For this purpose, the processing unit can carry out a corresponding signal processing.

FIGS. 2 to 4 show by way of example how reception properties of station signals are detected in the wireless receiver 10, 12 of the motor vehicle 34. In the present embodiment, FIGS. 2 to 4 relate to the reception properties of different station signals 36, 38, 40, such as are received on different days, for example.

FIG. 2 shows the motor vehicle 34 in which (not shown in FIG. 2) the wireless receiver 10 is arranged. The wireless receiver 10 receives the station signal 36 from the transmitting station 14 via the radio channel 16, and detects a standardized volume value A. The standardized volume value A is stored in a memory cell 42 of the wireless receiver 10.

FIG. 3 now shows, in a comparable situation on the following day to the situation according to FIG. 2, that the wireless receiver 10 is now receiving a station signal 38. This station signal 38, too, is received via radio. A correspondingly standardized volume value G is stored in a second memory cell 44 of the wireless receiver 10.

On a following day, a third station signal 40 is received according to FIG. 4 by the wireless receiver 10 and a standardized volume value C is stored in a memory cell 46.

When the standardized volume values A, G, C are detected, position data are also stored at the same time, so that the memory cells 42, 44, 46 store position-related received data sets. These are transmitted to the server device 24 as soon as the wireless receiver 10 can be coupled to the Internet 28 and consequently to the server device 24 via the communication channel 20. The server device 24 then stores these reception data sets.

FIG. 5 shows a corresponding process. Data transmission from the wireless receiver 10 to the server device 24 is shown with arrows 48, whereas corresponding data transmissions from the server device 24 to the wireless receiver 10 are shown with the arrows 50. It can also be seen from FIG. 5 that the server device 24 comprises a database 52 in which the position-related received data sets are stored. Instead of or in addition to the standardized volume, received field strengths, relative time offsets and/or the like can also be determined. These data can also be included in the particular received data set.

Figure 6:
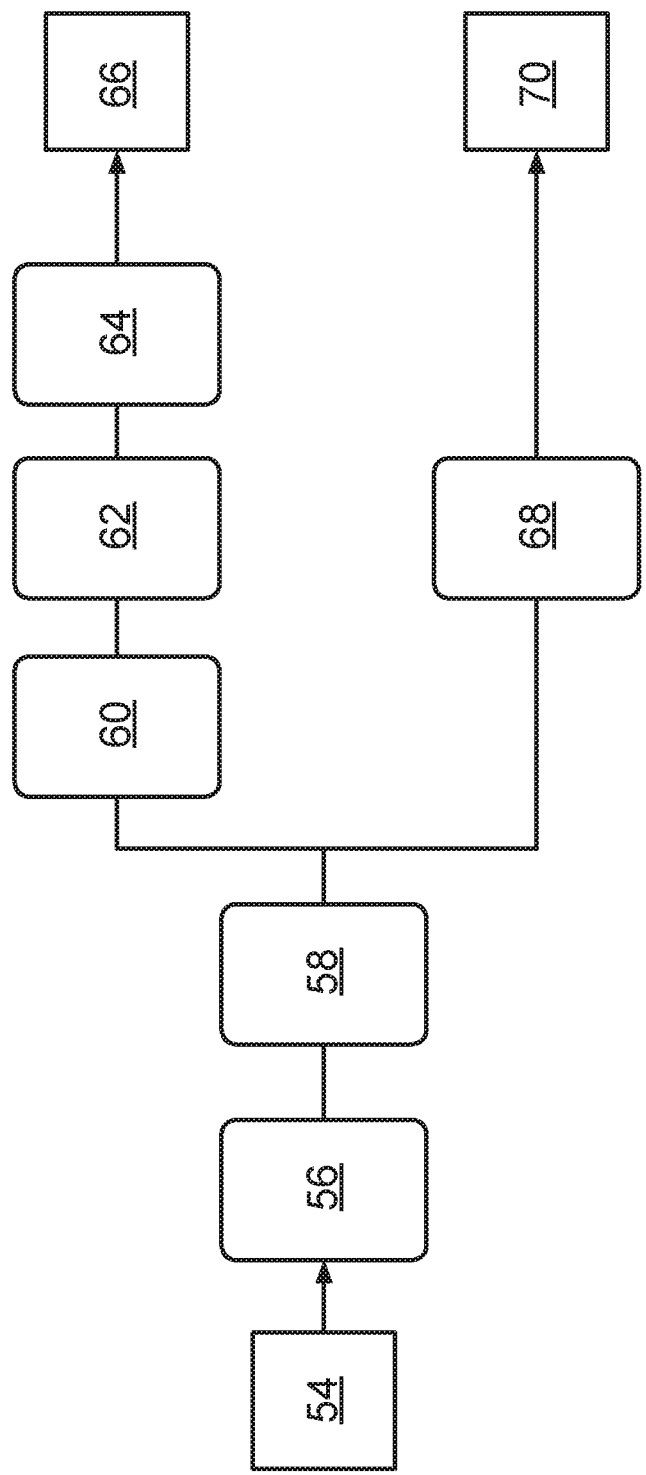
FIG. 6 is a schematic block diagram for determining standardized volume values by the wireless receiver.

FIG. 6 shows, in a schematic block diagram, an example of how the wireless receiver 10, 12 determines standardized volume values. At 54 the demodulated and/or decoded station signal, in this case an audio signal, is input. A sampling rate is adapted in block 56. The signal processing is then continued in block 58, which uses an audio filter, for example in accordance with ITU 1770.

From here the signal processing divides into two parallel branches. In a first signal processing branch, a quadratic averaging is performed on the basis of a time base of approximately 400 ms in a block 60. In a block 62 the signals for a left and a right channel are then added. In a subsequent block 64, fading out and/or long-term averaging takes place over a period of, in the present case, approximately 300 s. Finally, in a block 66, an average standardized volume level is determined in predetermined units LUFS (loudness unit full scale).

In a second parallel branch, a peak level is determined in a block 68 over a long period of approximately 300 s. In a subsequent block 70, a standardized volume value for the peak level is then determined in the unit LUFS. These values can then be included in the position-related received data set.

Figures 7, 8:
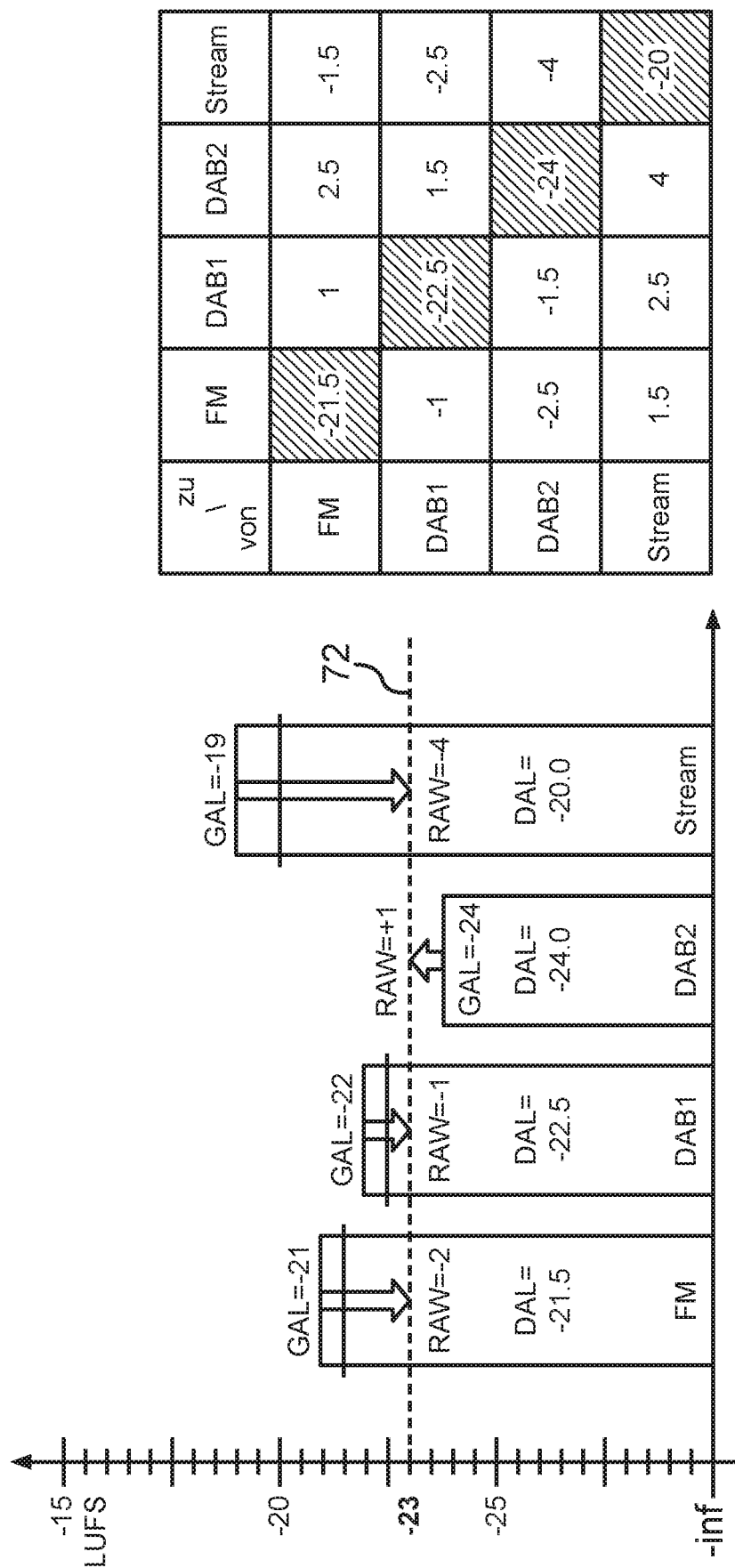
FIG. 7 is a schematic diagram representation of volume values of a selected station signal received via different reception channels.
FIG. 8 is a schematic diagram representation of an assignment of adaptation values based on FIG. 7.

FIG. 7 shows in a schematic diagram the reception situation for the station signal of the transmitting station 14 via different communication channels, in this case a first communication channel FM, a second communication channel DAB1, a third communication channel DAB2 and a fourth channel with regard to streaming. The ordinate is assigned in the volume value in the unit LUFS. A line 72 parallel to the abscissa indicates a value of −23 LUFS, which relates to a target value for further signal processing. The graphs for FM, DAB1, DAB2 and Stream show the particular volume values of the station signals received by the wireless receiver 10. The reception volume level (GAL: guarded average volume level) indicates a measure of the standardized volume with which the station signal is received via the particular one of the communication channels. The value RAW indicates the deviation in relation to the target value 72.

FIG. 8 shows, in a schematic table representation, the corresponding deviation values in relation to the situation according to FIG. 7. In the left column in FIG. 8, the initial situation of the setting of the wireless receiver 10 is shown. The target situation for setting the wireless receiver 10 is shown in the top line. Appropriate setting adaptations are indicated in the fields in between. The fields with a gray background in the diagonal of the table running from top left to bottom right indicate the corresponding reception values. The other fields relate to the corresponding adjustment factors when switching between the communication channels.

It can be seen from the figures how an adaptation can be carried out in a simple manner. The corresponding position-related received data sets can be transmitted to the server device 24. It can be provided that the position-related received data sets include only one table, as shown in FIG. 8. In addition, it can of course also be provided that reception properties, as shown in FIG. 7, are included in the position-related received data set.

The embodiments shown in the figures serve exclusively to explain the present disclosure and are not intended to limit it.

The invention claimed is:

1. A method for operating a wireless receiver, the method comprising:
  identifying a plurality of communication channels configured to transmit at least one station signal of a plurality of station signals emitted from a transmitting station;
  detecting reception properties for each of the identified plurality of communication channels;
  detecting position data of the wireless receiver;
  determining a position-related received data set for the at least one station signal transmitted by the identified plurality of communication channels, the position-related received data set comprising at least the position data of the wireless receiver assigned to the reception properties detected for each of the identified plurality of communication channels; and
  transmitting the position-related received data set for the at least one station signal to a server device, the server device storing the position-related received data set to be retrievable by the server device, wherein
    the at least one station signal is transmitted by at least two different communication channels of the identified plurality of communication channels, and the position-related received data set comprises data representing a difference between a standardized volume of the at least two different communication channels and a particular relative time offset of the at least one station signal as received by the at least two different communication channels.

2. The method according to claim 1, wherein the reception properties for each of the identified plurality of communication channels and the position data of the wireless receiver are detected at a first predetermined instant.

3. The method according to claim 2, wherein the position data of the wireless receiver is determined again at a second predetermined instant and the method is repeated if the position data of the wireless receiver is changed.

4. The method according claim 1, wherein the reception properties for each of the identified plurality of communication channels include at least a received signal strength, a standardized volume value, a value for a reception quality, a type of modulation, or a type of coding.

5. A method for operating a wireless receiver to receive station signals from transmitting stations via communication channels and to emit a selected one of the station signals, the method comprising:
  determining position data of the wireless receiver;
  transmitting, to a server device, at least the position data of the wireless receiver and a position-related received data set for the selected one of the station signals, the server device storing the position-related received data set in a retrievable manner;
  receiving, via the wireless receiver, the position-related received data set for the selected one of the station signals in response to the position data of the wireless receiver and the position-related received data set for the selected one of the station signals;
  selecting a communication channel to emit the selected one of the station signals based on the received position-related received data set, wherein
    the selected one of the station signals is received via at least two different communication channels, and
    a difference between a standardized volume of the at least two different communication channels and a particular relative time offset of the selected one of the station signals are determined from the position-related received data set.

6. The method according to claim 5, wherein:
the wireless receiver is arranged on a motor vehicle,
the motor vehicle is guided according to a route specified by a navigation device, and
the position data of the wireless receiver is determined based on the specified route.

7. A system, comprising:
a wireless receiver configured to:
  identify a plurality of communication channels configured to transmit at least one station signal of a plurality of station signals emitted from a transmitting station;
  detect reception properties for each of the identified plurality of communication channels;
  detect position data of the wireless receiver;
  determine a position-related received data set for the at least one station signal transmitted by the identified plurality of communication channels, the position-related received data set comprising at least the position data of the wireless receiver assigned to the reception properties detected for each of the identified plurality of communication channels; and
  transmit the position-related received data set for the at least one station signal to a server device, the server device storing the position-related received data set to be retrievable by the server device, wherein
    the wireless receiver is configured to receive the at least one station signal via at least two different communication channels of the identified plurality of communication channels,
    the wireless receiver is configured to determine a difference between a standardized volume of the at least two different communication channels and a particular relative time offset of the at least one station signal as received by the at least two different communication channels, and
    the wireless receiver is configured to store the difference between the standardized volume of the at least two different communication channels and the particular relative time offset of the at least one station signal as the position-related received data set.

8. A system, comprising:
a wireless receiver to receive station signals from transmitting stations via communication channels and to emit a selected one of the station signals, the wireless receiver being configured to:
  determine position data of the wireless receiver;
  transmit, to a server device, at least the position data of the wireless receiver and a position-related received data set for the selected one of the station signals, the server device storing the position-related received data set in a retrievable manner;
  receive identification data on a communication channel with a most favorable reception property as determined by the server device in response to the position data of the wireless receiver and the position-related received data set for the selected one of the station signals as transmitted to the server device; and
  set the wireless receiver to receive and emit the selected one of the station signals based on the identification data on the communication channel, wherein
    the wireless receiver is configured to receive the selected one of the station signals via at least two different communication channels, and
    the wireless receiver is configured to determine a difference between a standardized volume of the at least two different communication channels and a particular relative time offset of the selected one of the station signals from the position-related received data set.

9. A motor vehicle comprising a wireless receiver, the wireless receiver being configured to:
  identify a plurality of communication channels configured to transmit at least one station signal of a plurality of station signals emitted from a transmitting station;
  detect reception properties for each of the identified plurality of communication channels;
  detect position data of the wireless receiver;
  determine a position-related received data set for the at least one station signal transmitted by the identified plurality of communication channels, the position-related received data set comprising at least the position data of the wireless receiver assigned to the reception properties detected for each of the identified plurality of communication channels; and
  transmit the position-related received data set for the at least one station signal to a server device, the server device storing the position-related received data set to be retrievable by the server device, wherein the wireless receiver is configured to receive the at least one station signal via at least two different communication channels of the identified plurality of communication channels, the wireless receiver is configured to determine a difference between a standardized volume of the at least two different communication channels and a particular relative time offset of the at least one station signal as received by the at least two different communication channels, and the wireless receiver is configured to store the difference between the standardized volume of the at least two different communication channels and the particular relative time offset of the at least one station signal as the position-related received data set.

10. A motor vehicle comprising a wireless receiver that receives station signals from transmitting stations via communication channels and emits a selected one of the station signals, the wireless receiver being configured to:

determine position data of the wireless receiver;

transmit, to a server device, at least the position data of the wireless receiver and a position-related received data set for the selected one of the station signals, the server device storing the position-related received data set in a retrievable manner;

receive identification data on a communication channel with a most favorable reception property as determined by the server device in response to the position data of the wireless receiver and the position-related received data set for the selected one of the station signals as transmitted to the server device; and set the wireless receiver to receive and emit the selected one of the station signals based on the identification data on the communication channel, wherein the wireless receiver is configured to receive the selected one of the station signals via at least two different communication channels, and the wireless receiver is configured to determine a difference between a standardized volume of the at least two different communication channels and a particular relative time offset of the selected one of the station signals from the position-related received data set.

* * * * *